United States Patent
Hamashoji et al.

(10) Patent No.: US 10,613,463 B2
(45) Date of Patent: Apr. 7, 2020

(54) IMAGE PROCESSING APPARATUS, METHOD, AND NON-TRANSITORY COMPUTER-READABLE STORAGE MEDIUM HAVING TONE CORRECTION BASED ON STATUS

(71) Applicants: Hiroki Hamashoji, Kanagawa (JP); Atsushi Yoshida, Kanagawa (JP); Hayato Kano, Kanagawa (JP)

(72) Inventors: Hiroki Hamashoji, Kanagawa (JP); Atsushi Yoshida, Kanagawa (JP); Hayato Kano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/239,974

(22) Filed: Jan. 4, 2019

(65) Prior Publication Data

US 2019/0286033 A1    Sep. 19, 2019

(30) Foreign Application Priority Data

Mar. 14, 2018  (JP) .................................. 2018-047328

(51) Int. Cl.
*G03G 15/00* (2006.01)
*G06K 15/02* (2006.01)

(52) U.S. Cl.
CPC ..... *G03G 15/5041* (2013.01); *G03G 15/5058* (2013.01); *G03G 15/556* (2013.01); *G06K 15/027* (2013.01); *G03G 2215/00037* (2013.01)

(58) Field of Classification Search
CPC .......... G03G 15/5041; G03G 15/5058; G03G 15/5033; G03G 15/55; G03G 21/20; G03G 2215/00037; G03G 2215/00059; G03G 2215/00071; G03G 15/556; H04N 1/00015; H04N 1/00045; H04N 1/00087; H04N 1/4078; G06K 15/027; G06F 3/1229

(Continued)

(56) References Cited

U.S. PATENT DOCUMENTS

| | | | |
|---|---|---|---|
| 7,061,648 B2 * | 6/2006 | Nakajima | ............ H04N 1/4078 358/1.9 |
| 8,982,372 B2 * | 3/2015 | Noda | ................. G06K 15/1881 358/1.13 |
| 2016/0044207 A1 | 2/2016 | Kobayashi | |

FOREIGN PATENT DOCUMENTS

| | | |
|---|---|---|
| JP | 2002-296851 | 10/2002 |
| JP | 2006189562 A * | 7/2006 |

(Continued)

*Primary Examiner* — Robert B Beatty
(74) *Attorney, Agent, or Firm* — Harness, Dickey & Pierce, P.L.C.

(57) ABSTRACT

An image forming apparatus includes a memory and circuitry. The memory is configured to store a status of the image forming apparatus and a first detected density value obtained in a first tone correction based on a dither pattern. The circuitry is configured to calculate a difference between the status of the image forming apparatus upon the first tone correction and the status of the image forming apparatus upon a second tone correction following the first tone correction. The circuitry is further configured to calculate a correction value according to the difference in the status of the image forming apparatus, based on the first detected density value and a second detected density value obtained in the second tone correction based on a reference pattern.

15 Claims, 8 Drawing Sheets

(58) Field of Classification Search
USPC .......................................... 399/43, 44, 49, 72
See application file for complete search history.

(56) References Cited

FOREIGN PATENT DOCUMENTS

| | | |
|---|---|---|
| JP | 2008-224845 | 9/2008 |
| JP | 2016-037042 | 3/2016 |

* cited by examiner

| PATTERN TYPE | DATE OF ACQUISITION | DISTANCE TRAVELED | INTERNAL TEMPERATURE | DETECTED DENSITY VALUE |
|---|---|---|---|---|
| DITHER PATTERN A | 20XX/3/10 | ZZ m | VV °C | XXX |
| DITHER PATTERN B | 20XX/3/2 | XX m | ZZ °C | YYY |
| DITHER PATTERN C | 20XX/3/6 | WW m | YY °C | ZZZ |
| ⋮ | ⋮ | ⋮ | ⋮ | ⋮ |

FIG. 4

| TIME ELAPSED | 0H TO 12H | 12H TO 720H | FROM 720H |
|---|---|---|---|
| CORRECTION PERCENTAGE 1 | 100% | 70% | 40% |
| CORRECTION PERCENTAGE 2 | 0% | 30% | 60% |

FIG. 5

| DISTANCE TRAVELED | 0M TO 30M | 30M TO 90M | FROM 90M |
|---|---|---|---|
| CORRECTION PERCENTAGE 1 | 100% | 70% | 40% |
| CORRECTION PERCENTAGE 2 | 0% | 30% | 60% |

| DIFFERENCE IN INTERNAL TEMPERATURE | 0°C TO 5°C | 5°C TO 15°C | FROM 15°C |
|---|---|---|---|
| CORRECTION PERCENTAGE 1 | 100% | 60% | 20% |
| CORRECTION PERCENTAGE 2 | 0% | 40% | 80% |

IMAGE PROCESSING APPARATUS, METHOD, AND NON-TRANSITORY COMPUTER-READABLE STORAGE MEDIUM HAVING TONE CORRECTION BASED ON STATUS

CROSS-REFERENCE TO RELATED APPLICATIONS

This patent application is based on and claims priority pursuant to 35 U.S.C. § 119(a) to Japanese Patent Application No. 2018-047328, filed on Mar. 14, 2018, in the Japan Patent Office, the entire disclosure of which is hereby incorporated by reference herein.

BACKGROUND

Technical Field

Embodiments of the present disclosure relate to an image forming apparatus, an image forming method, and a non-transitory computer-readable storage medium.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly, or indirectly via an intermediate transfer belt. Finally, a fixing device applies heat and pressure to the recording medium bearing the toner image to fix the toner image onto the recording medium. Thus, an image is formed on the recording medium.

Such image forming apparatuses may correct, e.g., an output density conforming to the current device characteristics.

In order to reduce such correction, some image forming apparatuses are capable of executing a plurality of calibrations.

SUMMARY

In one embodiment of the present disclosure, a novel image forming apparatus includes a memory and circuitry. The memory is configured to store a status of the image forming apparatus and a first detected density value obtained in a first tone correction based on a dither pattern. The circuitry is configured to calculate a difference between the status of the image forming apparatus upon the first tone correction and the status of the image forming apparatus upon a second tone correction following the first tone correction. The circuitry is further configured to calculate a correction value according to the difference in the status of the image forming apparatus, based on the first detected density value and a second detected density value obtained in the second tone correction based on a reference pattern.

Also described are novel image processing method and non-transitory, computer-readable storage medium storing computer-readable program code that causes a computer to perform the image forming method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4 is a first table of correction percentage data that is used for tone correction of a second calibration performed by the printer;

FIG. 5 is a second table of correction percentage data that is used for tone correction of the second calibration performed by the printer;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
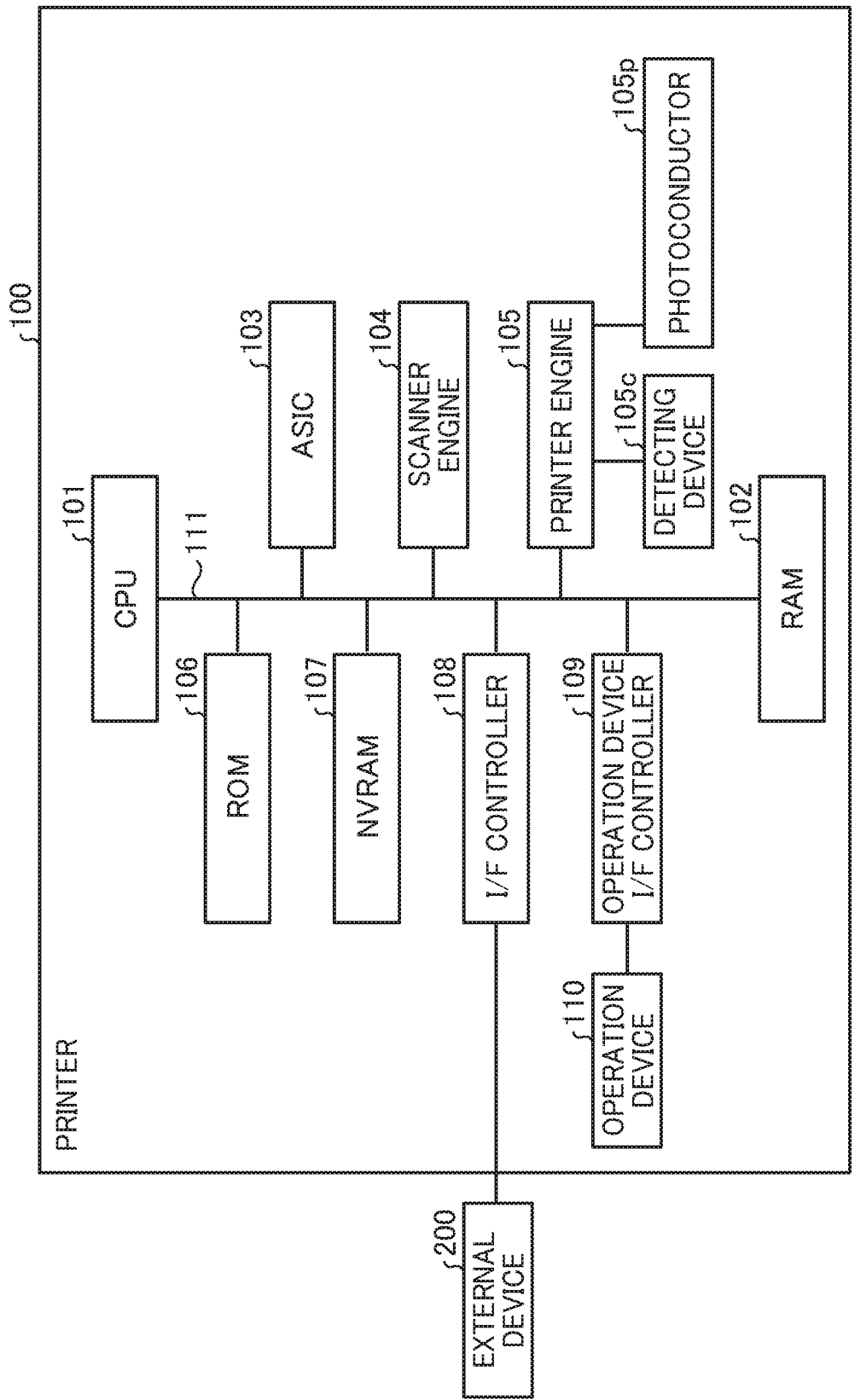
FIG. 1 is a block diagram illustrating an example of a configuration of a printer according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

Initially with reference to FIG. 1, a description is given of an entire configuration of an image forming apparatus.

FIG. 1 is a block diagram illustrating an example of a configuration of a printer 100 serving as an image forming apparatus according to an embodiment of the present disclosure.

As illustrated in FIG. 1, the printer 100 includes a central processing unit (CPU) 101, a random access memory (RAM) 102, an application specific integrated circuit (ASIC) 103, a scanner engine 104, a printer engine 105, a read only memory (ROM) 106, non-volatile random access memory (NVRAM) 107, an interface (I/F) controller 108, and an operation device I/F controller 109. The above-described components are communicably connected to each other via a CPU bus 111.

The CPU 101 gives instructions to the above-described components via the CPU bus 111 to control the above-described components. In the present embodiment, the printer 100 includes a single CPU 101. Alternatively, the printer 100 may include a plurality of CPUs 101 to enhance processing performance.

The RAM 102 is connected to the CPU 101 and the like to temporarily store data processed by the above-described components.

The ASIC 103 is an integrated circuit (IC) dedicated to image processing. The ASIC 103 includes hardware elements for image processing. Instead of the ASIC 103, a program for image processing may be stored in the ROM 106 and executed by the CPU 101.

The ROM 106 stores programs that the printer 100 executes.

The NVRAM 107 is a nonvolatile memory that holds information unique to the printer 100 (e.g., a counter value of the number of printed sheets).

The scanner engine 104 is a device that reads an image. Processing such as digital signal processing is performed as appropriate on read document image data.

The printer engine 105 is a device that receives print data and prints out an image according to the print data. The printer engine 105 forms an image by a laser method, a light emitting diode (LED) method, or an inkjet method, for example.

The printer engine 105 includes a detecting device 105c. The detecting device 105c is a counter that records a time when the printer engine 105 executes a given operation, for example. Alternatively, the detecting device 105c may be a counter that counts a distance traveled by a photoconductor 105p included in the printer engine 105. Alternatively, the detecting device 105c may be a temperature sensor that detects, e.g., an internal temperature of the printer engine 105. Alternatively, the detecting device 105c may be a density sensor that reads the density of an image transferred onto an intermediate transfer belt. The detecting device 105c may be at least one of the counters and sensors described above.

An operation device 110 is connected to the operation device I/F controller 109. The operation device 110 is a human machine interface that receives an input from, e.g., a user of the printer 100 and presents information to the user, under control of the operation device I/F controller 109. The operation device 110 includes a button that enables operation of the printer 100 and an indicator that displays a status of the printer 100. Examples of the indicator include a display, such as an LED or a liquid crystal display (LCD), and a speaker.

The I/F controller 108 is connected to an external device 200 such as a personal computer (PC) to receive print data from the external device 200, through a local connection by use of, e.g., the Institute of Electrical and Electronics Engineers (IEEE) 1284 interface or a universal serial bus (USB), or through a network connection such as Ethernet (registered trademark).

Figures 2, 3:
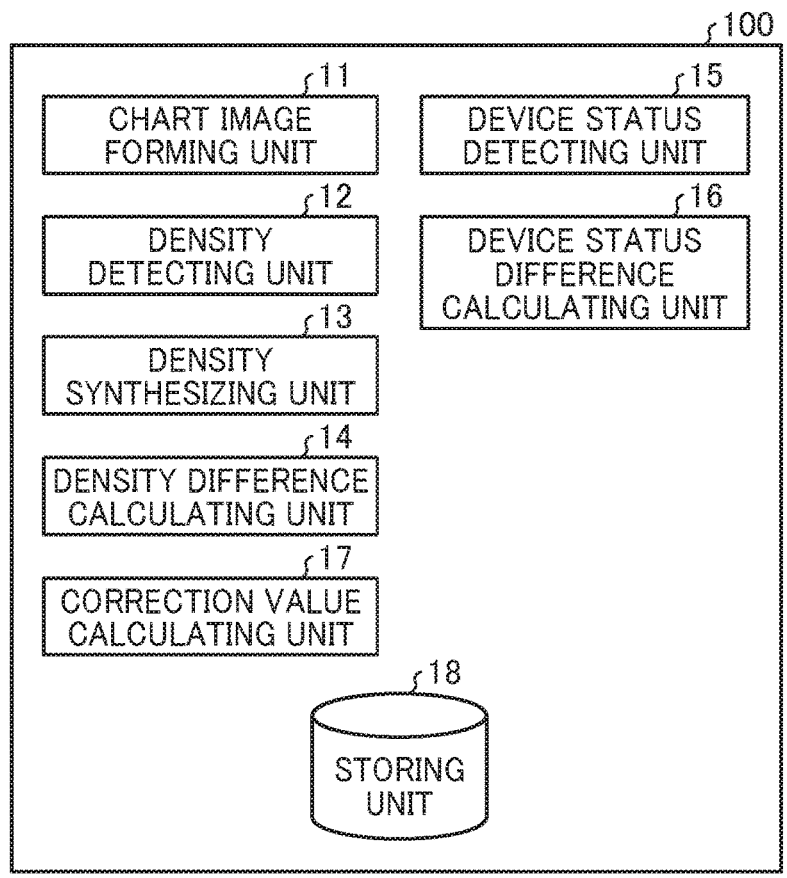
FIG. 2 is a diagram illustrating an example of a functional configuration of the printer.
FIG. 3 is a table of first calibration history data in the printer.

Referring now to FIG. 2, a description is given of a functional configuration of the printer 100 described above.

FIG. 2 is a diagram illustrating an example of the functional configuration of the printer 100.

For the sake of simplicity, FIG. 2 primarily illustrates the functions according to the present embodiment. However, the functions of the printer 100 are not limited thereto.

The printer 100 serves as an image forming apparatus that is capable of executing a first calibration and a second calibration. The first calibration herein serves as a first tone correction that is performed for each dither pattern. The dither pattern is used for a pseudo expression of shading of an image. The second calibration herein serves as a second tone correction that is performed based on a reference pattern. As illustrated in FIG. 2, the printer 100 includes a storing unit 18, a device status difference calculating unit 16, and a correction value calculating unit 17. The storing unit 18 stores a status of printer 100 and a first detected density value obtained when the first calibration (i.e., first tone correction) is performed based on a dither pattern. The device status difference calculating unit 16 calculates a difference between a status of the printer 100 upon the first calibration and a status of the printer 100 upon the second calibration, in a case in which the second calibration (i.e., second tone correction) is performed after the first calibration (i.e., first tone correction). The correction value calculating unit 17 calculates a correction value according to the difference in the status of the printer 100, based on the first detected density value and a second detected density value obtained in the second calibration based on the reference pattern. Now, a detailed description is given of the functions of the printer 100 described above.

In a printer, the shading at the time of printing sometimes fluctuates with time-dependent fluctuation of the status of the printer. The printer 100 of the present embodiment has a function of correcting a tone to suppress such fluctuation. Such tone correction is performed by at least two methods: the first calibration as a first tone correction method and the second calibration as a second tone correction method. The first calibration is a more accurate method than the second calibration; whereas the second calibration is a simpler method than the first calibration.

In order to implement such a function, the printer 100 includes a chart image forming unit 11, a density detecting unit 12, a density synthesizing unit 13, a density difference calculating unit 14, a device status detecting unit 15, the device status difference calculating unit 16, the correction value calculating unit 17, and the storing unit 18.

In order to perform tone correction, the chart image forming unit 11 outputs a correction chart including a plurality of grayscale values. The printer 100 has a plurality of dither patterns. The correction chart is formed based on the plurality of dither patterns, for example. Dithering is a technique for artificially expressing shades and colors that are physically unreproducible, by use of fine dots, as in a case of expressing more tones with a limited number of colors. The dither pattern is data as a basis for dot formation for performing such an artificial or pseudo expression. The chart image forming unit 11 is implemented by, e.g., the printer engine 105 and a program executed by the CPU 101 illustrated in FIG. 1.

The density detecting unit 12 reads an image of the correction chart output from the chart image forming unit 11 to detect a density of the correction chart. The density detecting unit 12 stores, in the storing unit 18, at least a detected density value obtained upon the first calibration. The density detecting unit 12 is implemented by, e.g., the scanner engine 104, the detecting device 105*c* of the printer engine 105, and a program executed by the CPU 101 illustrated in FIG. 1.

Upon the second calibration, the density synthesizing unit 13 synthesizes a detected density value obtained from an output of the correction chart in the second calibration and the detected density value obtained in the first calibration, which is performed before the second calibration. The density synthesizing unit 13 is implemented by, e.g., a program executed by the CPU 101 illustrated in FIG. 1.

The density difference calculating unit 14 calculates a difference between a target density and the density of the correction chart detected by the density detecting unit 12 upon the first calibration. The density difference calculating unit 14 calculates a difference between the target density and the density synthesized by the density synthesizing unit 13 upon the second calibration. The density difference calculating unit 14 is implemented by, e.g., a program executed by the CPU 101 illustrated in FIG. 1.

The device status detecting unit 15 detects a status of the printer 100. The status of the printer 100 is, e.g., the time, as an execution time, when the printer engine 105 executes a given operation. Alternatively, the status of the printer 100 may be a distance traveled by the photoconductor 105*p* included in the printer engine 105. Alternatively, the status of the printer 100 may be an internal temperature of the printer engine 105. The status of the printer 100 may be at least one of the execution time, the distance traveled by the photoconductor 105*p*, and the internal temperature described above as examples. The device status detecting unit 15 stores, in the storing unit 18, at least a status of the printer 100 at the time when the first calibration is performed. The device status detecting unit 15 is implemented by, e.g., the detecting device 105*c* illustrated in FIG. 1.

Upon the second calibration, the device status difference calculating unit 16 calculates a difference between a status of the printer 100 at the time of the second calibration and the status of the printer 100 at the time of the first calibration, which is performed before the second calibration. Specifically, the device status difference calculating unit 16 calculates an elapsed time from when the first calibration is performed until when the second calibration is performed. Alternatively, the device status difference calculating unit 16 may calculate a distance traveled by the photoconductor 105*p* from when the first calibration is performed until when the second calibration is performed. Alternatively, the device status difference calculating unit 16 may calculate a difference between an internal temperature of the printer 100 upon the first calibration and an internal temperature of the printer 100 upon the second calibration. The difference in the status of the printer 100 may be at least one of the elapsed time, the distance traveled by the photoconductor 105*p*, and the difference in the internal temperature of the printer 100 described above. The device status difference calculating unit 16 is implemented by, e.g., a program executed by the CPU 101 illustrated in FIG. 1.

The correction value calculating unit 17 calculates a correction value that is used for tone correction. In the first calibration, the correction value calculating unit 17 calculates a correction value from the detected density value of the correction chart obtained in the first calibration. In the second calibration, the correction value calculating unit 17 calculates a correction value from the density synthesized by the density synthesizing unit 13 and the difference between the status of the printer 100 at the time of the second calibration and the status of the printer 100 at the time of the first calibration. The correction value calculating unit 17 is implemented by, e.g., a program executed by the CPU 101 illustrated in FIG. 1.

The storing unit 18 stores various kinds of data for the functions of the printer 100. The storing unit 18 is implemented by, e.g., the RAM 102 and the NVRAM 107 illustrated in FIG. 1.

Referring now to FIGS. 3 to 6, a description is given of examples of data that the storing unit 18 stores.

FIG. 3 is a table of first calibration history data in the printer 100.

As described above, the storing unit 18 stores the status of the printer 100 and the detected density value obtained upon the first calibration.

Specifically, the storing unit 18 stores the first calibration history data illustrated in FIG. 3. In the first calibration, tone correction is performed at a given time, by use of the correction chart described above, for each of dither patterns A, B, and C, for example. The first calibration history data indicates a history of results on an occasion basis. Specifically, the first calibration history data includes, for each dither pattern, the date on which tone correction is performed, the distance traveled by the photoconductor 105*p*, the internal temperature of the printer 100, and the detected density value of the correction chart output at the time when the tone correction is performed.

Figures 6, 7:
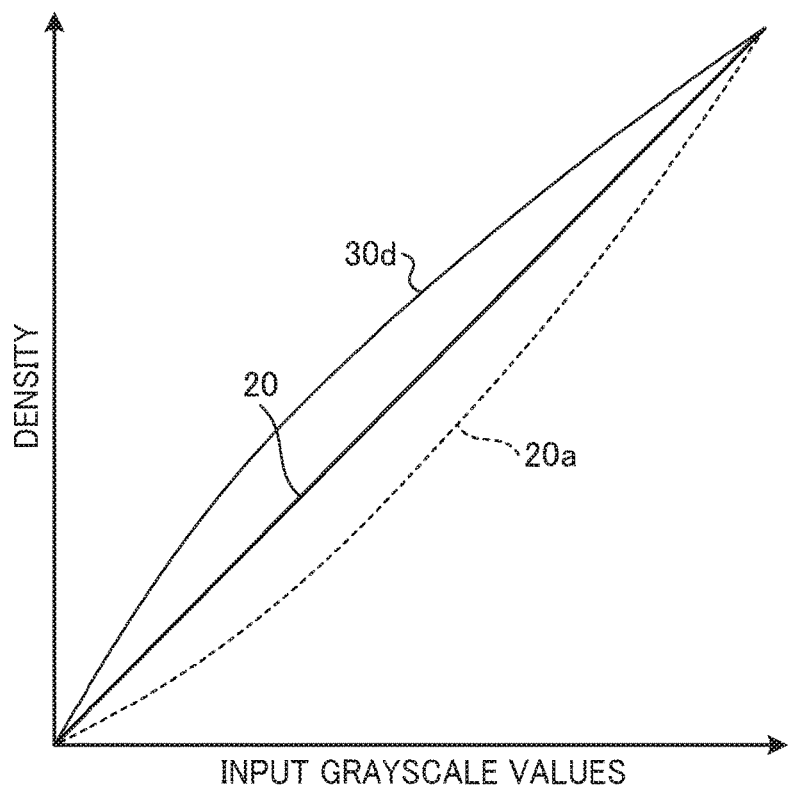
FIG. 6 is a third table of correction percentage data that is used for tone correction of the second calibration performed by the printer.
FIG. 7 is a graph illustrating a relationship between input grayscale values and density in tone correction of the first calibration performed by the printer.

FIGS. 4 to 6 illustrate tables of correction percentage data that are used for tone correction of the second calibration performed by the printer 100.

Upon tone correction of the second calibration, detected density values are reflected in calculation of a correction value. The detected density values include not only the detected density value of the correction chart output upon the second calibration, but also the detected density value of the correction chart obtained upon the first calibration, which is performed before the second calibration. In the printer 100, a reflection ratio of the detected density value obtained upon the first calibration and a reflection ratio of the detected density value obtained upon the second calibration are changed according to the difference between the status of the printer 100 upon the first calibration and the status of the printer 100 upon the second calibration. Note that the reflection ratios are ratios reflected in calculation of a correction value.

Each correction percentage illustrated in each of FIGS. 4 to 6 indicates a reflection ratio of each detected density value. Specifically, Correction percentage 1 is a reflection ratio of a detected density value obtained in the first calibration. Correction percentage 2 is a reflection ratio of a detected density value obtained in the second calibration.

FIG. 4 illustrates Correction percentages 1 and 2 in a case in which the elapsed time from the first calibration until the second calibration time is used as a difference in the status of the printer 100. FIG. 5 illustrates Correction percentages 1 and 2 in a case in which the distance traveled is used as a difference in the status of the printer 100. As described above, the distance traveled is a distance traveled by the photoconductor 105p from when the first calibration is performed until when the second calibration is performed. FIG. 6 illustrates Correction percentages 1 and 2 in a case in which the difference in internal temperature is used as a difference in the status of the printer 100. As described above, the difference in internal temperature is a difference between the internal temperature of the printer 100 upon the first calibration and the internal temperature of the printer 100 upon the second calibration.

In any of the cases described above, the smaller the difference between the status of the printer 100 upon the first calibration and the status of the printer 100 upon the second calibration is, the smaller the correction percentage of the detected density value obtained in the second calibration is set. On the other hand, the greater the difference between the status of the printer 100 upon the first calibration and the status of the printer 100 upon the second calibration is, the greater the correction percentage of the detected density value obtained in the second calibration is set.

Now, a description is given of examples of operation of the printer 100 in the first calibration and the second calibration.

The first calibration is performed at a given time according to a status of the printer 100 or in response to a user instruction. At this time, the printer 100 or the user selects one or more dither patterns, as one or more target dither patterns, to be subjected to the first calibration.

When the one or more dither patterns are selected as one or more target dither patterns for the first calibration, the chart image forming unit 11 outputs a correction chart. Specifically, the chart image forming unit 11 transfers the correction chart onto an intermediate transfer belt or prints the correction chart on paper in the printer 100.

In a case in which the chart image forming unit 11 prints the correction chart on paper, e.g., a scanner of the scanner engine 104 reads the correction chart on the paper. Alternatively, in a case in which the chart image forming unit 11 transfers the correction chart onto the intermediate transfer belt, e.g., a density sensor of the printer engine 105 reads the correction chart on the intermediate transfer belt. The density detecting unit 12 detects a density of the correction chart from an image of the correction chart thus read. The density detecting unit 12 stores, in the first calibration history data stored in the storing unit 18, the density thus detected (i.e., detected density value) of the correction chart.

The device status detecting unit 15 detects a status of the printer 100 at this time and stores the status of the printer 100 in the first calibration history data stored in the storing unit 18, in association with the detected density value of the correction chart.

Thus, the first calibration history data is updated with new data. In a case in which previous data exists with respect to the one or more dither patterns as one or more target dither patterns for the present tone correction, the previous data is replaced with the new data acquired. Thus, the data is updated.

Referring now to FIG. 7, a description is given of tone correction of the first calibration performed by the printer 100.

FIG. 7 is a graph illustrating a relationship between input grayscale values and density in the tone correction of the first calibration performed by the printer 100.

The horizontal axis of the graph indicates input grayscale values based on a correction chart including a plurality of grayscale values. The vertical axis of the graph is the density with respect to the input grayscale values.

As illustrated in FIG. 7, an actually detected density value 20a is deviated from a target density value 20 of the printer 100 to a certain extent. The density difference calculating unit 14 calculates a density difference between the target density value 20 and the actually detected density value 20a.

In the first calibration, tone correction (or gamma correction) is applied so that an actually output density approaches the target density value 20. The correction value calculating unit 17 calculates a correction value 30d that is used for the tone correction, based on the density difference calculated by the density difference calculating unit 14.

The correction value 30d thus calculated is applied to a target dither pattern for the present tone correction. Strictly speaking, value fluctuation caused by time-dependent changes in the status of the printer 100 depends on dither patterns. It is therefore preferable to perform tone correction for each dither pattern.

Now, a description is given of an example of operation of the printer 100 in the second calibration.

The second calibration is performed at a given time according to a status of the printer 100 or in response to a user instruction. The second calibration is performed for all dither patterns at one time by use of a correction chart formed based on a reference pattern. The reference pattern is a reference dither pattern. The reference pattern may be dedicated to the second calibration. Alternatively, any dither pattern may be selected from the plurality of dither patterns.

The chart image forming unit 11 outputs a correction chart that is used for the second calibration. The density detecting unit 12 detects a density of the correction chart. The device status detecting unit 15 detects a present status of the printer 100.

The device status difference calculating unit 16 and the density synthesizing unit 13 refer to the first calibration history data in the storing unit 18 to confirm whether the first calibration history data exists for each dither pattern. For a dither pattern of which the history data exists, the device status difference calculating unit 16 reads a previous status of the printer 100 and calculates a difference between the previous status of the printer 100 and the present status of the printer 100. The density synthesizing unit 13 reads a detected density value of the dither pattern.

Figure 8:
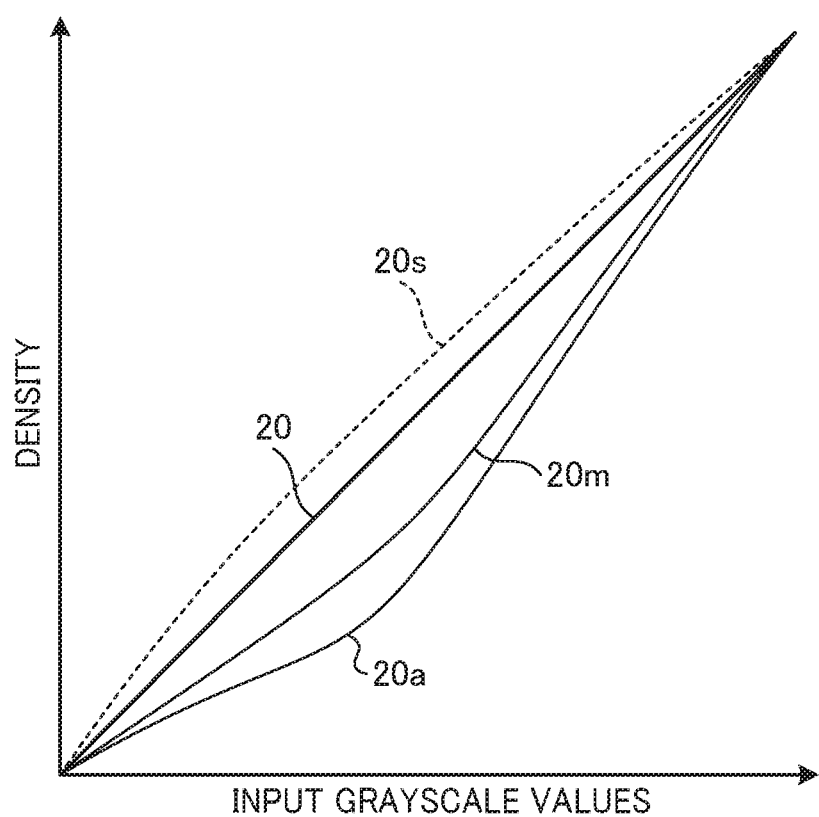
FIG. 8 is a graph illustrating a relationship between input grayscale values and density in tone correction of the second calibration performed by the printer.

Referring now to FIG. 8, a description is given of tone correction of the second calibration performed by the printer 100.

FIG. 8 is a graph illustrating a relationship between input grayscale values and density in the tone correction of the second calibration performed by the printer 100.

The horizontal axis of the graph indicates input grayscale values based on a correction chart including a plurality of grayscale values. The vertical axis of the graph is the density with respect to the input grayscale values.

As illustrated in FIG. 8, a detected density value 20s, which is a density value detected in the present second calibration, is different to a certain extent from the detected density value 20a, which is a density value of a given dither pattern detected in the previous first calibration. The density synthesizing unit 13 synthesizes the detected density value 20s and the detected density value 20a to generate a synthesized density value 20m. At this time, the density synthesizing unit 13 changes a reflection ratio of the detected density value 20s and a reflection ratio of the detected density value 20a according to the difference in the status of the printer 100 calculated by the device status difference calculating unit 16. Specifically, the synthesized density value 20m is obtained by the following equation:

synthesized density value 20m=detected density value 20a×Correction percentage 1+detected density value 20s×Correction percentage 2, where Correction percentage 1+Correction percentage 2=100.

In a case in which the difference in the status of the printer 100 is the elapsed time from the first calibration until the second calibration, the density synthesizing unit 13 refers to the table of FIG. 4 stored in the storing unit 18 to select Correction percentages 1 and 2 corresponding to the elapsed time calculated by the device status difference calculating unit 16.

In a case in which the difference in the status of the printer 100 is the distance traveled by the photoconductor 105p from when the first calibration is performed until when the second calibration is performed, the density synthesizing unit 13 refers to the table of FIG. 5 stored in the storing unit 18 to select Correction percentages 1 and 2 corresponding to the distance traveled calculated by the device status difference calculating unit 16.

In a case in which the difference in the status of the printer 100 is the difference between an internal temperature of the printer 100 upon the first calibration and an internal temperature of the printer 100 upon the second calibration, the density synthesizing unit 13 refers to the table of FIG. 6 stored in the storing unit 18 to select Correction percentages 1 and 2 corresponding to the difference in internal temperature calculated by the device status difference calculating unit 16.

Specifically, when the difference in the status of the printer 100 is relatively small from the first calibration to the second calibration, that is, when the status of the printer 100 exhibits little change, the detected density value 20a obtained in the first calibration is reflected in greater percentage than the detected density value 20s obtained in the second calibration, because the first calibration is more accurate than the second calibration. Each of FIGS. 4 to 6 illustrates a case or condition in which Correction percentage 2 is 0%. That is, when the difference in the status of the printer 100 is substantially small or smaller than a threshold, the detected density value 20s obtained in the second calibration may not be reflected.

By contrast, when the difference in the status of the printer 100 is relatively large from the first calibration to the second calibration, that is, when the status of the printer 100 exhibits a substantially large change, the detected density value 20s obtained in the second calibration is reflected in greater percentage than the detected density value 20a obtained in the first calibration, to reduce the impact arising from such a large change in the status of the printer 100.

The density difference calculating unit 14 calculates a difference between the target density value 20 and the synthesized density value 20m thus generated.

In the second calibration, tone correction (or gamma correction) is applied so that the synthesized density value 20m approaches the target density value 20. The correction value calculating unit 17 calculates a correction value that is used for tone correction of the given dither pattern, based on the density difference calculated by the density difference calculating unit 14.

These operations are repeated, for example, until correction values are calculated and applied for all the dither patterns. The second calibration for collectively performing tone correction as described above may be less accurate than the first calibration. On the other hand, the second calibration is simpler than the first calibration. According to the present embodiment, the printer 100 performs the first calibration and the second calibration as appropriate for the status of the printer 100.

Figure 9:
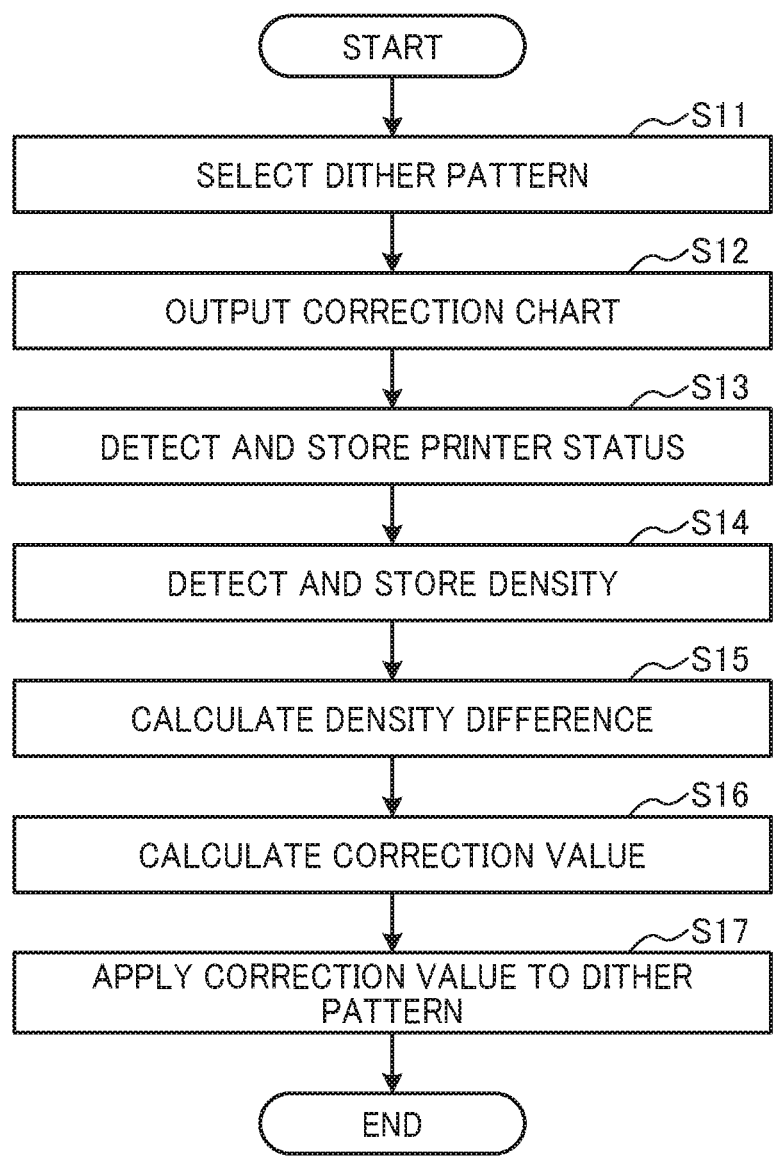
FIG. 9 is a flowchart of an example of a tone correction process of the first calibration performed by the printer.

Referring now to FIG. 9, a description is given of an example of a tone correction process of the first calibration as an image forming process of the printer 100.

FIG. 9 is a flowchart of an example of the tone correction process of the first calibration performed by the printer 100.

As illustrated in FIG. 9, in step S11, the printer 100 selects one or more dither patterns, as one or more target dither patterns, to be subjected to tone correction. Alternatively, the printer 100 receives one or more dither patterns selected by, e.g., a user.

In step S12, the chart image forming unit 11 outputs a correction chart.

In step S13, the device status detecting unit 15 detects a present status of the printer 100 and stores the present status of printer 100 in the storing unit 18.

In step S14, the density detecting unit 12 detects a density of the correction chart output by the chart image forming unit 11, and stores the density detected (i.e., detected density value) in the storing unit 18.

In step S15, the density difference calculating unit 14 calculates a density difference between the detected density value and a target density value.

In step S16, the correction value calculating unit 17 calculates a correction value from the density difference calculated by the density difference calculating unit 14.

In step S17, the correction value thus calculated is applied to the one or more target dither patterns.

Thus, the tone correction process of the first calibration ends.

Figure 10:
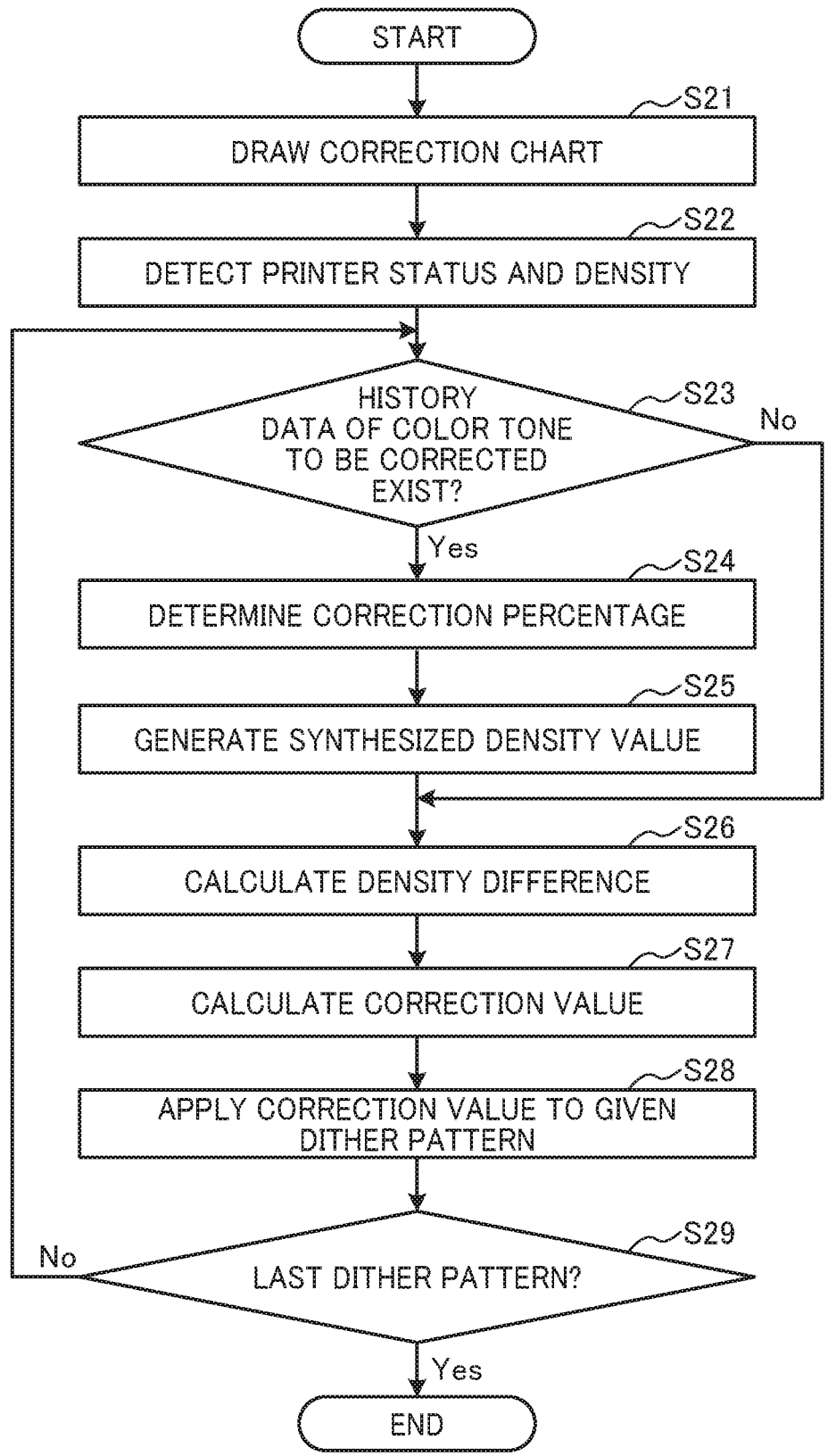
FIG. 10 is a flowchart of an example of a tone correction process of the second calibration performed by the printer.

Referring now to FIG. 10, a description is given of an example of a tone correction process of the second calibration as an image forming process of the printer 100.

FIG. 10 is a flowchart of an example of the tone correction process of the second calibration performed by the printer 100.

As illustrated in FIG. 10, in step S21, the chart image forming unit 11 draws or outputs a correction chart as a reference for the second calibration.

In step S22, the device status detecting unit 15 detects a present status of the printer 100. Also, the density detecting unit 12 detects, as a detected density value, a density of the correction chart output by the chart image forming unit 11.

In step S23, the device status difference calculating unit 16 and the density synthesizing unit 13 refer to the storing unit 18 to determine whether history data exists with respect to a given dither pattern, in other words, whether history data of color tone to be corrected exists.

When the history data exists (YES in step S23), the density synthesizing unit 13 determines Correction percentages 1 and 2 in step S24. Specifically, the device status difference calculating unit 16 calculates a difference between a status of the printer 100 upon the first calibration and a status of the printer 100 upon the second calibration. Based on the difference thus calculated, the density synthesizing unit 13 selects, from the correction percentage data, Correction percentages 1 and 2 corresponding to the difference in the status of the printer 100.

In step S25, the density synthesizing unit 13 generates a synthesized density value. Specifically, as in the equation described above, the density synthesizing unit 13 multiplies the detected density value obtained in the first calibration by Correction percentage 1 selected while multiplying the detected density value obtained in the second calibration by Correction percentage 2 selected, thereby generating the synthesized density value.

In step S26, the density difference calculating unit 14 calculates a density difference between a target density value and the synthesized density value thus generated.

In step S27, the correction value calculating unit 17 calculates a correction value from the density difference calculated by the density difference calculating unit 14.

In step S28, the correction value thus calculated is applied to the given dither pattern.

On the other hand, when the history data does not exist (NO in step S23), the process jumps to step S26. That is, the second calibration is performed by use of the detected density value, without generating the synthesized density value.

In step S26, the density difference calculating unit 14 calculates a density difference between the target density value and the detected density value, which is a density value detected in the present second calibration.

In step S27, the correction value calculating unit 17 calculates a correction value from the density difference calculated by the density difference calculating unit 14.

In step S28, the correction value thus calculated is applied to the given dither pattern.

In step S29, the printer 100 determines whether the correction value is applied to a last dither pattern in step S28. When the printer 100 determines that the correction value is not applied to the last dither pattern in step S28 (NO in step S29), then the process returns to the step S23 and repeats the step S23 and subsequent steps. On the other hand, when the printer 100 determines that the correction value is applied to the last dither pattern in step S28 (YES in step S29), then the process ends.

Thus, the tone correction process of the second calibration ends.

In an image forming apparatus that is capable of selectively executing a plurality of calibrations, the image forming apparatus or a user, for example, switches between a full calibration for executing all of the plurality of calibrations and a simple calibration for executing a part of the calibrations. However, executing the simple calibration after the full calibration might degrade image quality.

Figure 11:
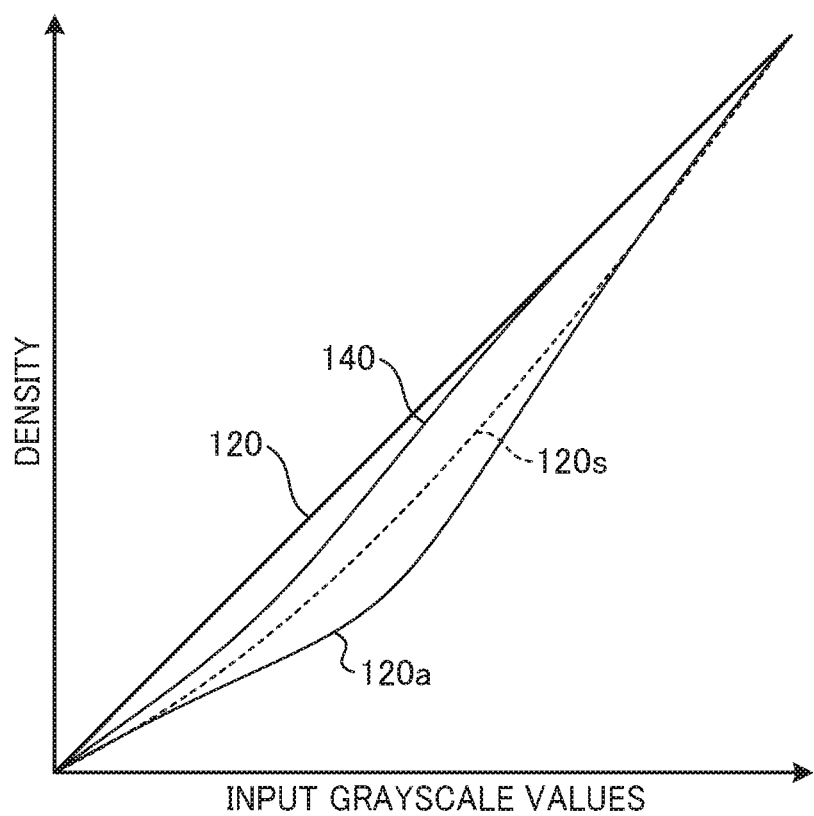
FIG. 11 is a graph illustrating a relationship between input grayscale values and density in a comparative example.

Referring now to FIG. 11, a description is given of a difference in correction characteristics between a detailed calibration and a simple calibration in a comparative example.

FIG. 11 is a graph illustrating a relationship between input grayscale values and density in the comparative example.

In the detailed calibration of the comparative example, a detected density value 120a is obtained with respect to a given dither pattern. On the other hand, in the simple calibration of the comparative example, a detected density value 120s is obtained with respect to a reference pattern. In the simple calibration, when correction is made to cause the detected density value 120s alone to approach a target density value 120, without reflecting the result of the detailed calibration, a detected density value 140, which is obtained after the correction of the given dither pattern, deviates from the target density value 120. That is, FIG. 11 indicates that the simple calibration following the detailed calibration rather degrades the image quality.

In order to address such a situation, in the printer 100 of the present embodiment, the data of the previous first calibration is reflected upon execution of the second calibration. Accordingly, execution of the second calibration, which is simpler than the first calibration, follows the first calibration, without degrading the image quality.

In addition, upon execution of the second calibration in the printer 100, a reflection ratio of data at the time of the first calibration is changed according to the difference in the status of the printer 100 from the time of the first calibration. Accordingly, in the present embodiment, tone correction is performed as appropriate for the current status of the printer 100.

Now, a description is given of some variations.

In the embodiment described above, the second calibration is executed for all the dither patterns. Alternatively, in the second calibration, the printer 100 or a user, for example, may select one or more dither patterns as one or more target dither patterns for correction.

According to the embodiment described above, the second calibration is executed by use of the tables of correction percentage data illustrated in FIGS. 4 to 6, but the tables of correction percentage data are not limited to FIGS. 4 to 6. In FIGS. 4 to 6, Correction percentages 1 and 2 are determined depending on the difference in the status of the printer 100. Alternatively, Correction percentages 1 and 2 may be determined for each dither pattern. The status of the printer 100 is not limited to the elapsed time, the distance traveled, or the internal temperature difference described above. Correction percentage data based on another status may be used. The correction percentage may be an average of correction percentage data based on the statuses of the printer 100 described above. The correction percentage data described above may be accumulated for each tone correction to be updated, as appropriate, as data with higher accuracy.

In the embodiment described above, the synthesized density value 20m is calculated by use of the detected density value 20a and the detected density value 20s in the second calibration. Alternatively, a detected density value may be obtained from a correction chart corresponding to a reference pattern in advance to predict a detected density value for each dither pattern. The detected density value thus predicted may be reflected in the detected density value 20s. Alternatively, the second calibration may be executed with the first calibration to reflect a deviation of a value obtained in the next second calibration in the detected density value 20s.

In the embodiment described above, the first calibration and the second calibration are executed separately. Alternatively, the first calibration and the second calibration may be performed simultaneously, by executing the first calibration on a selected dither pattern and reflecting the result of the calibration in an unselected dither pattern, for example.

In the embodiment described above, the printer 100 serves as an image forming apparatus. Alternatively, the image forming apparatus may be, e.g., a copier, a scanner, a facsimile machine, or a multifunction peripheral (MFP) having at least two of printing, copying, scanning, and facsimile functions. The first calibration and the second calibration of the embodiment described above may be also applied to a display for displaying an image, an electrophotography, and the like.

According to the embodiments described above, the image forming apparatus prevents degradation of image quality while employing a plurality of tone correction methods.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image forming apparatus comprising:
    a memory configured to store a status of the image forming apparatus and a first detected density value obtained in a first tone correction based on a dither pattern; and
    circuitry configured to:
        determine a difference between the status of the image forming apparatus for the first tone correction and a status of the image forming apparatus for a second tone correction, subsequent to the first tone correction; and
        determine a correction value according to the status difference determined, based on the first detected density value and a second detected density value, obtained in the second tone correction based on a reference pattern, wherein the circuitry is further configured to change, according to the difference in status, respective correction percentages of the first detected density value and the second detected density value in the correction value.
2. The image forming apparatus of claim 1,
    wherein the memory is configured to store, for each of a plurality of dither patterns, a respective status of the image forming apparatus and a respective first detected density value obtained in the first tone correction.
3. The image forming apparatus of claim 1, further comprising a photoconductor,
    wherein the difference in status of the image forming apparatus includes at least one of a difference of execution times of the first tone correction and the second tone correction, a distance traveled by the photoconductor, and difference of an internal temperature of the image forming apparatus.
4. The image forming apparatus of claim 1,
    wherein the circuitry is configured not to reflect the second detected density value in the correction value in response to the difference determined being relatively smaller than a threshold.
5. The image forming apparatus of claim 1,
    wherein the circuitry is configured to set a relatively greater reflection ratio of the second detected density value in the correction value as the difference determined is relatively greater.
6. The image forming apparatus of claim 1,
    wherein the circuitry is configured to change, for each dither pattern, at least one of the respective correction percentages of the first detected density value and the second detected density value.
7. The image forming apparatus of claim 1, wherein the circuitry is configured to determine, according to the status difference, respective correction percentages such that upon the status difference being relatively small, the first detected density value is reflected in a relatively greater percentage than the second detected density value.
8. An image forming method comprising:
    storing, in a memory, a status of an image forming apparatus and a first detected density value obtained in a first tone correction based on, a dither pattern;
    determining a difference in the status of the image forming apparatus for the first tone correction and a status of the image forming apparatus for a second tone correction, subsequent to the first tone correction; and
    determining a correction value according to the status difference determined, based on the first detected density value and a second detected density value, obtained in the second tone correction based on a reference pattern, wherein, according to the status difference, respective correction percentages of the first detected density value and the second detected density value in the correction value are changed.
9. The image forming method of claim 8, wherein the storing includes storing, for each of a plurality of dither patterns, a respective status of the image forming apparatus and a respective first detected density value obtained in the first tone correction.
10. The image forming method of claim 8, wherein the determining of the status difference includes determining at least one of a difference of execution times of the first tone correction and the second tone correction, a distance traveled by the photoconductor, and difference of an internal temperature of the image forming apparatus.
11. The image forming method of claim 8, wherein the determining, according to the status difference, includes determining respective correction percentages such that upon the status difference being relatively small, the first detected density value is reflected in a relatively greater percentage than the second detected density value.
12. A non-transitory, computer-readable storage medium storing computer-readable program code that causes a computer to perform an image forming method, the method comprising:
    storing, in a memory, a status of an image forming apparatus and a first detected density value obtained in a first tone correction based on a dither pattern;

determining a difference in the status of the image forming apparatus for the first tone correction and a status of the image forming apparatus for a second tone correction, subsequent to the first tone correction; and determining a correction value according to the status difference determined, based on the first detected density value and a second detected density value, obtained in the second tone correction based on a reference pattern, wherein, according to the status difference, respective correction percentages of the first detected density value and the second detected density value in the correction value are changed.

13. The non-transitory, computer-readable storage medium of claim 12, storing computer-readable program code that causes a computer to perform the image forming method, wherein the storing of the includes storing, for each of a plurality of dither patterns, a respective status of the image forming apparatus and a respective first detected density value obtained in the first tone correction.

14. The non-transitory, computer-readable storage medium of claim 12, storing computer-readable program code that causes a computer to perform the image forming method, wherein the determining of the status difference includes determining at least one of a difference of execution times of the first tone correction and the second tone correction, a distance traveled by the photoconductor, and difference of an internal temperature of the image forming apparatus.

15. The non-transitory, computer-readable storage medium of claim 12, storing computer-readable program code that causes a computer to perform the image forming method, wherein the determining, according to the status difference, includes determining respective correction percentages such that upon the status difference being relatively small, the first detected density value is reflected in a relatively greater percentage than the second detected density value.

* * * * *